US008606214B2

(12) United States Patent
Hilgers

(10) Patent No.: US 8,606,214 B2
(45) Date of Patent: Dec. 10, 2013

(54) METHOD OF ACTUATING A SWITCH BETWEEN A DEVICE AND A POWER SUPPLY

(75) Inventor: Achim Hilgers, Alsdorf (DE)

(73) Assignee: Koninklijke Philips N.V., Eindhoven (NL)

( * ) Notice: Subject to any disclaimer, the term of this patent is extended or adjusted under 35 U.S.C. 154(b) by 408 days.

(21) Appl. No.: 12/920,138

(22) PCT Filed: Mar. 2, 2009

(86) PCT No.: PCT/IB2009/050821
§ 371 (c)(1),
(2), (4) Date: Aug. 30, 2010

(87) PCT Pub. No.: WO2009/109889
PCT Pub. Date: Sep. 11, 2009

(65) Prior Publication Data

US 2011/0006616 A1 Jan. 13, 2011

(30) Foreign Application Priority Data

Mar. 7, 2008 (EP) .................................... 08102377

(51) Int. Cl.
*H04B 1/16* (2006.01)

(52) U.S. Cl.
USPC ..................... 455/343.1; 455/574; 455/127.1; 455/343.2; 455/343.3; 342/361; 307/126; 307/140

(58) Field of Classification Search
USPC .......... 307/126, 140; 340/10.3; 348/552, 734; 455/343.1, 574, 127.1, 343.2, 343.3; 342/361
See application file for complete search history.

(56) References Cited

U.S. PATENT DOCUMENTS

| | | | | |
|---|---|---|---|---|
| 2,362,832 | A | 11/1940 | Land | |
| 5,713,783 | A | 2/1998 | Szoke et al. | |
| 6,011,483 | A * | 1/2000 | Tanaka et al. | 340/10.33 |
| 6,127,799 | A | 10/2000 | Krishman | |
| 2005/0093374 | A1 * | 5/2005 | Connors et al. | 307/126 |
| 2006/0028582 | A1 * | 2/2006 | Zahn | 348/552 |
| 2007/0038334 | A1 | 2/2007 | Chou et al. | |
| 2007/0236613 | A1 * | 10/2007 | Foss | 348/734 |

* cited by examiner

*Primary Examiner* — Junpeng Chen

(57) ABSTRACT

The invention describes a method of actuating a switch (S) between a device (Di) to be controlled and a power supply (P), which method comprises the steps of generating a first electrical signal (14) in a remote control unit (10) and converting the first electrical signal (14) into electromagnetic radiation (EM) by means of a first transmitting antenna (Ti) of the remote control unit (10). A first detecting antenna (Ri) of a remote control interface module (20) of the device (Di) to be controlled detects the electromagnetic radiation (EM) to obtain a second electrical signal (24), which is passively converted into a switch actuating signal (25). The switch actuating signal (25) is actuated to switch the device (Di) to be controlled between an operating mode in which current is drawn from the power supply (P) by the device (Di) during operation, and an inactive mode in which the device (Di) is completely disconnected from the power supply (P) so that no current is drawn by the device (Di). The invention further describes a system (1) for actuating a switch (S) between a device (Di) to be controlled and a power supply (P). The invention also describes a remote control interface module (20) and a remote control unit (10).

14 Claims, 10 Drawing Sheets

METHOD OF ACTUATING A SWITCH BETWEEN A DEVICE AND A POWER SUPPLY

FIELD OF THE INVENTION

The invention describes a method of actuating a switch between a device to be controlled and a power supply. The invention also describes a system for actuating a switch between a device to be controlled and a power supply. The invention further describes a remote control interface unit and a remote control device.

BACKGROUND OF THE INVENTION

Almost every consumer electronics device available today features a so-called standby mode of operation so that the device, even when turned 'off', is still receptive to control signals. The device can react at any time to a signal sent by a remote control unit to turn the device on again. Examples of such devices are televisions, satellite receivers, air-conditioners, video recorders, tuners, personal computers, etc. Usually, an easily visible 'standby' LED indicates to the user that the device is in standby mode. Being able to place a device in standby is generally regarded as practical and convenient, compared to the situation hitherto in which the user had to physically turn the device on or off at the mains switch.

When a device is placed in standby mode, a small amount of current is still drawn by, for instance, standby circuitry and a standby LED. A corresponding amount of 'standby power' is therefore consumed. Usually, the standby power is quite low, only a few watts, but particularly inefficient devices can consume up to 20 watts in standby mode. Many consumers are becoming aware of the negative impact on the climate caused by energy over-consumption, and would prefer to reduce the amount of unnecessary power dissipation. Since almost every household or office has several devices that are 'turned off' by placing them in standby mode, the total amount of standby power dissipated by the millions of devices around the globe is actually quite considerable.

However, it is to be expected that users would still wish to be able to turn on and off consumer electronics devices by means of a remote control, without having to physically turn the device off at the mains switch.

One way of reducing the amount of standby power might be to monitor the current drawn by the device, so that a decision can be reached, requiring without any user input, whether the device should be disconnected from the power supply. If only a minimal amount of current is drawn over a certain length of time, it could be assumed that the device is not in use, and the device can then be automatically disconnected from the mains power supply by a dedicated switch. However, this approach still involves some amount of power dissipation for the required current monitoring components, for instance a power supply for a timer circuit. Also, a certain amount of time should be allowed to elapse before actually disconnecting the device, and during this time, standby power is consumed. Furthermore, a module of the device for receiving signals from a remote control unit must continually be supplied with power so that the user can reactivate the device at any time. Such an interface could be powered by a battery instead of the mains power supply, but this would not alter the fact that current will still be drawn by the device, and power consumed.

Therefore, it is an object of the invention to provide a way of activating and deactivating a device such that the device draws no current when deactivated by remote control.

SUMMARY OF THE INVENTION

To this end, the present invention describes a method of actuating a switch between a device to be controlled and a power supply, which method comprises the steps of generating a first electrical signal in a remote control unit and converting the first electrical signal into electromagnetic radiation by means of a first transmitting antenna of the remote control unit. In the method according to the invention, the electromagnetic radiation is detected with a first detecting antenna of a remote control interface module of the device to be controlled to obtain a second electrical signal. The method also comprises the step of passively converting the second electrical signal into a switch actuating signal and actuating the switch using the switch actuating signal to switch the device to be controlled between an operating mode in which current is drawn from the power supply by the device during operation, and an inactive mode in which the device is completely disconnected from the power supply so that no current is drawn by the device.

In the method according to the invention, the electromagnetic radiation is automatically detected in an entirely passive manner by the detecting antenna, which is caused to resonate by the energy in the electromagnetic radiation, giving the second electrical signal. Also, the conversion of this AC electrical signal into a DC switch actuating signal is performed in an entirely passive manner, i.e. by using electrical components that do not require a power supply. An obvious advantage of the method according to the invention is that, when a device is turned off in the manner described, it is indeed off, and not merely in standby. The device is entirely quiescent when turned off using this method, since it does not draw any current and does not consume any power. An obvious advantage of the method according to the invention is the saving in energy that can be obtained. Another further advantage is that the device can still be reactivated by the remote control, so that convenience and ease of use are not compromised in any way.

An appropriate remote control interface module comprises a first detecting antenna for detecting electromagnetic radiation to obtain a second electrical signal, a passive conversion unit for passively converting the second electrical signal into a switch actuating signal, and a switch for actuating by the actuating signal to switch a device to be controlled between an operating mode in which current is drawn by the device during operation and an inactive mode in which the device to be controlled is completely disconnected from the power supply so that no current is drawn by that device.

An appropriate system for actuating a switch between a device to be controlled and a power supply comprises a signal generator for generating a first electrical signal in a remote control unit and a first transmitting antenna of the remote control unit for converting the first electrical signal into electromagnetic radiation. The system further comprises a first detecting antenna for detecting electromagnetic radiation to obtain a second electrical signal, a passive conversion unit for passively converting the second electrical signal into a switch actuating signal, and a switch for actuating by the actuating signal to switch a device to be controlled between an operating mode in which current is drawn by the device during operation and an inactive mode in which the device to be controlled is completely disconnected from the power supply so that no current is drawn by that device.

The technique of wireless transmission will be known to a person skilled in the art. Briefly, the signal generator on the transmitter side generates an AC signal of a certain frequency and amplitude, which signal is applied to the transmitting antenna, causing this to resonate, thereby converting the electrical signal into electromagnetic radiation which propagates through free space and in turn causes the receiving antenna to resonate so that a corresponding electrical signal is induced at the receiver side.

Examples of devices that can be controlled using the method and system according to the invention might be the usual type of consumer electronics devices such as televisions, DVD players, satellite receivers, speakers, etc., or the new type of lighting systems for home or commercial use in which the brightness or colour temperature of a number of lamps can be adjusted using a remote control unit.

The dependent claims and the subsequent description disclose particularly advantageous embodiments and features of the invention.

In order to minimise interference between devices that exchange wireless signals, wireless communication is governed by standards that, among others, assign the frequency bands to be used by different types of devices. For example, wireless communication in a local or personal area network (LAN or PAN), with ranges of up to 100 meters, can be effected in an ISM (International Scientific and Medical) frequency band. Therefore, in a particularly preferred embodiment of the invention, the first electrical signal comprises a high-frequency signal whose frequency lies in an ISM frequency band. Several such bands are available, with centre frequencies at 2.45 GHz, 915 MHz, or 5.8 GHZ.

The first electrical signal could be generated in the remote control unit for a predefined duration, for example, a few milliseconds. Alternatively, the first electrical signal can be generated as long as the user performs an appropriate action, such as pressing an appropriate button on the remote control unit, and holding the button pressed until the device to be controlled reacts.

The first electrical signal can be continuously generated, i.e. as a continuous signal without interruption. In a preferred embodiment of the invention, the first electrical signal comprises a pulsed high-frequency signal, i.e. the signal generator outputs a series of high-frequency pulses, perhaps with the aid of a suitable capacitor, as will be know to a person skilled in the art. One advantage of this technique is that the lifespan of a battery powering the signal generator is prolonged. More importantly, pulsing allows the energy, i.e. the amplitude, of the first electrical signal to effectively be increased, so that the reliability of the switching process is improved. At the same time, it can be ensured that an overall average energy value of the signal is not exceeded, so that the signal satisfies safety standards. Also, this technique allows the signal range to be increased. Again, the signal generated in this way can be of a predefined duration, or may be generated as long as the user carries out the appropriate action with the remote control device.

As already indicated, the first electrical signal is transmitted by the transmit antenna of the remote control unit. The simplest type of antenna radiates in all directions, so that the energy of the signal being transmitted is also distributed in all directions. It follows that only a small fraction of the signal energy arrives at the detecting antenna. Such a signal would therefore have to be of a sufficient amplitude in order to be reliably detected. An example of such a simple antenna is the dipole antenna. However, the range of a wireless signal can be increased when a directional antenna is used, as will be known to a person skilled in the art. Examples of state of the art antennae suitable for use in short-range wireless communication are patch antennae or micropatch antennae. Alternatively, a phased-array antenna could be used, for example as described in WO2005086281 A1. In a preferred embodiment of the invention, the first transmitting antenna and/or the second transmitting antenna are therefore directional antennae, so that the energy of the signal being transmitted is essentially focussed in one main direction. Naturally, this requires that the remote control unit containing the transmitting antenna must be aimed in the direction of the remote control interface unit of the device to be controlled. However, the user generally does this anyway, by aiming the remote control at, for instance, the television or receiver in order to change channels. By aiming the remote control specifically at a particular device or group of devices, only that device or device group is addressed, and any other devices outside of the range of the signal remain unaffected.

A high-frequency signal in an ISM band can be used to carry information which can be decoded at the receiving end. Therefore, in a further preferred embodiment of the invention, the first electrical signal comprises a carrier signal modulated to carry device identification information, such as a device identification code, for the device to be controlled. This can be advantageous when several devices are controlled by remote control units using the method according to the invention, or, more particularly, when a single remote control unit is used to control more than one device. In such a case, the remote control unit can be equipped with different buttons for addressing the different devices, and for each device activated or deactivated with this remote control, the actuating switch is opened or closed on the basis of the device identification information. This will be explained in more detail in conjunction with the description of the figures. The actuating switch in the remote control interface module of a device can be a simple toggle switch, so that the actuating signal causes the switch to be closed if it was already opened, and opened if it was already closed.

In a particularly preferred embodiment of the invention the passive conversion unit of the remote control interface module comprises a passive rectifier circuit, so that the AC electrical signal induced at the receiving antenna is converted into a DC signal without the use of any active components. Technological developments in recent years have led to better and more sensitive electrical switches, for example a MEMS (microelectromechanical systems) switch, that can be switched using a signals of very low strength without requiring boosters such as operational amplifiers such as are required in state of the art solutions. The passive rectifier circuit described here can therefore simply comprise passive components such as, for example, a high-frequency diode in conjunction with a capacitor to produce a smoothed DC switch actuating signal, whose signal strength is sufficient to actuate a sensitive electrical switch such as a MEMS switch. Alternatively, the actuating signal could switch a CMOS FET between the power supply and the device. In another practical embodiment of the invention, an optoisolator or optocoupler, for instance comprising a LED as light source and a phototransistor or phototriac as sensor, can be used as a switch between the conversion unit and the device. An optoisolator has the favourable advantage of electrically isolating the conversion unit from the device. The capabilities of such switches are known to a person skilled in the art and need not be explained in detail here.

In a preferred embodiment of the invention, the remote control interface module is incorporated in the device to be controlled. Advantageously, the remote control interface module described above can act as a preliminary stage for a state of the art remote control interface, since the user can control the device in the usual remote control manner once the device is activated from its quiescent state using one of the methods described above. Since the components required for the remote control interface module are small and inexpensive, a device such as a television or receiver can easily be adapted to include a remote control interface module according to the invention. Adaptation can take place during the manufacturing process, but it also conceivable that an already existing device could be modified to include the type of remote control interface module disclosed here. Equally, a remote control interface module for an existing device could be placed between the device and its power supply, for example between the mains plug of the device and an electrical socket.

A pair of antennae, one each in remote control unit and remote control interface module, is generally sufficient for a simple function such as toggling between an 'on' state and an 'off' state as already described above. However, the method according to the invention could also be used for more advanced functions such as increasing or decreasing the brightness of a light source that avails of a remote control interface unit. This can be achieved by generating the signal at distinct frequencies in the remote control unit, for example at a first frequency for an 'on' function, or at a second, different, frequency for an 'off' function. At the receive side, corresponding filters, responsive to the first or second frequency, can determine the intended function.

In an alternative to generating different frequencies at the transmit side and distinguishing these from each other at the receive side, a preferred embodiment of the system according to the invention comprises a second transmitting antenna in the remote control unit and a second receiving antenna in the remote control interface module. One pair of transmit/receive antennae could then be used for a first type of function such as 'ON' and 'brighter', and the other pair could be used for a second type of function such as 'darker' and 'OFF'. For example, the user could press an 'ON/brighter' button on the remote control unit to turn on a lamp. As long as the user keeps the button pressed, the light output of the lamp is increased. The user can release the button when the brightness of the lamp is satisfactory. Similarly, he can dim the lamp by pressing a 'darker/OFF' button. By keeping the button pressed, the light output of the lamp is steadily decreased until eventually the lamp is turned off.

A signal arriving at the detecting antenna of the remote control interface module may, under certain conditions, be relatively weak. In the case of a remote control interface module comprising two detecting antennae, each of which should detect a distinct signal, the low signal levels would result in correspondingly low DC signal levels, and may result in an inability of the remote control interface module to determine which device function was intended. The weak DC signal at the rectifier output can be boosted in the conversion unit by means of an appropriate voltage doubler or voltage multiplier to provide a stronger device control signal for the device control module. An example of such a voltage multiplier is a Villard cascade circuit, comprising an arrangement of capacitors and diodes. Other alternative voltage doubler circuits are possible, as will be clear to a person skilled in the art.

When more than one transmit/receive antenna pair is used, it is important to ensure that a signal sent from one of the transmitting antennae is primarily received by the corresponding receiving antenna. Therefore, in a preferred embodiment of the invention, the radiation characteristics of the first transmitting antenna are matched to radiation characteristics of the first receiving antenna, and/or radiation characteristics of the second transmitting antenna are matched to radiation characteristics of the second receiving antenna, such that electromagnetic radiation originating from the first transmitting antenna is detected primarily by the first receiving antenna, and/or electromagnetic radiation originating from the second transmitting antenna is detected primarily by the second receiving antenna.

Radiation characteristics of a transmitting antenna can be governed, for example, by polarising the electric field of the signal to be transmitted, i.e. by varying the electric field of the transmitted signal in a controlled manner. As will be known to a person skilled in the art, the polarisation of an electromagnetic signal is defined by the pattern that would be described by the tip of the electric field vector of the electromagnetic radiation in a plane perpendicular and normal to the direction of propagation of the signal. For example, the signal might exhibit linear, elliptical, or circular polarisation. The polarisation of the electromagnetic signal radiated by an antenna is largely governed by the choice of electrical components such as capacitors or inductors used in generating the electric signal applied to the antenna, and also by physical properties of the antenna. To ensure that electromagnetic radiation with a certain polarisation can be reliably detected, the appropriate characteristics of the receiving antenna are preferably matched to those of the transmitting antenna.

The orientation of a linear polarisation is given by the orientation of a dipole antenna relative to the earth's surface. In one embodiment of the invention, therefore, the physical orientations of such transmitting and receiving antenna pairs are preferably different, so that the first transmitting and receiving antenna pair exhibits a certain first orientation, for example a vertical orientation, and the second transmitting/receiving antenna pair exhibits an orientation essentially orthogonal to the orientation of the first transmitting/receiving antenna pair. In this example, the second transmitting/receiving antenna pair would exhibit a horizontal orientation.

By means of appropriate circuitry, an antenna comprising a pair of dipoles, suitably arranged with respect to each other, could be used to generate a circular or elliptically polarised signal whose electric field vector exhibits a left-hand or right-hand direction.

By matching the radiation characteristics as described, the method according to the invention ensures that electromagnetic radiation transmitted by the first transmitting antenna is primarily received by the first receiving antenna. The term 'primarily' is intentionally used, since the second receiving antenna may also pick up or detect the signal intended for the first receiving antenna. However, owing to the radiation characteristics of the antennae, the strength of the signal induced in the second receiving antenna will generally be negligible compared to the strength of the signal induced in the first receiving antenna.

In another alternative embodiment, the different functions of a device can be associated with distinct frequencies, so that a first antenna transmits a signal at a first frequency and associated with a first function, and a second antenna transmits a signal at a second frequency and associated with a second function. At the receive end, appropriate filters respond to the distinct signals received by one or more receive antennae.

In another, particularly straightforward embodiment, an antenna realised to generate a linearly polarised signal can be used to control two different devices. For example, the transmit antenna of a remote control is realised to generate linearly polarised electromagnetic radiation. To control a first device, whose receive antenna is realised to respond to horizontally polarised electromagnetic radiation, the user simply holds the remote control in the usual manner while aiming it at the device. To control a second device, with a receive antenna realised to respond to vertically polarised electromagnetic radiation, the user rotates the remote control by 90° clockwise or anticlockwise, while aiming the remote control at the device.

A remote control unit for use in a system according to the invention comprises a user interface for inputting a control input to disconnect the device from the power supply, or to reconnect it, in the manner described above. The control input might be a dedicated button on the remote control unit, for example a “device ON” or device “OFF” button, or a single button to toggle between these two states, i.e. a “device ON/OFF” button. Such a remote control unit should also comprise a signal generator for generating an electrical signal according to the control input, and a transmitting antenna for converting the electrical signal into electromagnetic radiation which can be detected for detection by the remote control interface module of the device.

A dedicated remote control unit, with just the “device ON” and device “OFF” functions, could be used to activate and deactivate the device, and a separate remote control could be used to select the device functions. However, it would be most advantageous, particularly from the user’s point of view, if an existing type of remote control with the usual device control functions could be used in a system according to the invention. Most remote control units have an array of buttons for the various device functions, and a wireless mode of communication for transmitting control signals to a device. Most existing remote controls use an infrared diode in the form of an LED for emitting an infrared control signal which is detected by sensors in a corresponding interface of the device to be controlled. Other types of remote control use a Bluetooth interface suitable for short range personal area network (PAN), with a range of up to 10 m, in the 2.45 GHz band. It will be clear to a person skilled in the art that these known types of remote control could easily be adapted to include the components necessary for the device control method according to the invention. For instance, a manufacturer would only need to carry out minor adaptations to a remote control unit. Existing components of a remote control device, such as a frequency generator, could be adapted as necessary. The adaptations to the remote control unit should evidently correspond to modifications in the remote control interface unit of the device itself It is also conceivable that an already existing remote control unit could be upgraded to include the necessary hardware.

The transmit antennae described above can, in addition to their use in activating and deactivating a device, can also be used for different application purposes, depending on the capabilities and design of the hand-held remote control. For example, for a remote control capable with Bluetooth capability, the transmit antenna could be used for wireless communication with a device once the device has been turned on using the method according to the invention.

A remote control unit according to the invention can also comprise a pair of transmitting antennae with different radiation characteristics, as described above. Such a remote control unit can then be used to control one or more devices with corresponding receive antennae.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
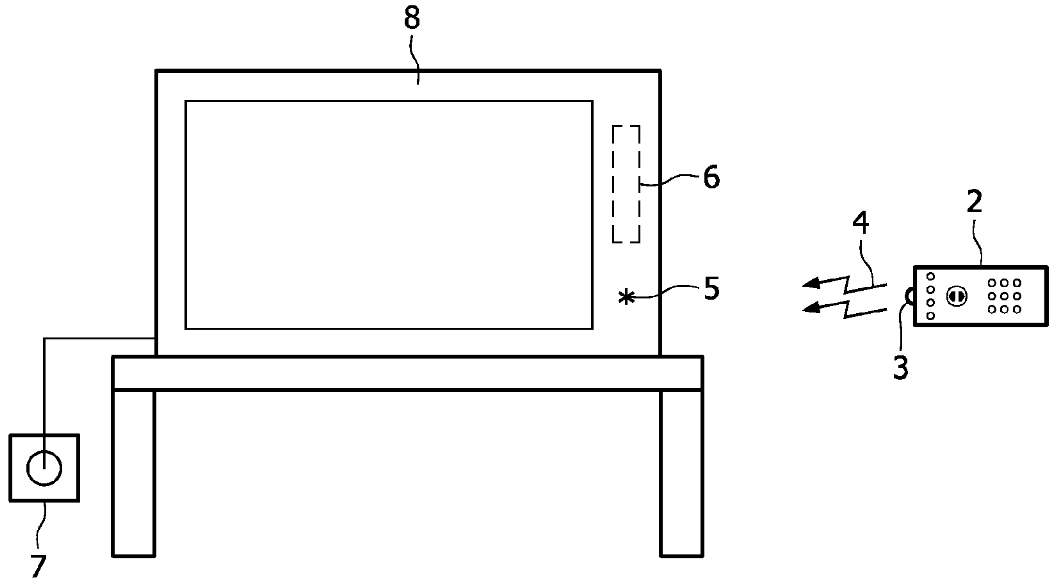
FIG. 1 (prior art)
FIG. 1 shows a state of the art remote control unit and a state of the art device in standby mode.

FIG. 1 shows a state of the art situation with a remote controllable device 8, in this case a television, and a remote control unit 2, which is usually operated by a user (not shown) at a distance from the device 8. The user presses certain buttons on the remote control unit 2 to turn the device 8 on, change device settings, for example to change channels or to adjust the loudspeaker volume, or to place the device 8 in a standby mode. The state of the art remote control unit 2 shown operates by generating an infrared control signal 4 by means of an infrared diode 3. When the remote control 2 is directed at the device 8, the control signals 4 can be detected by a suitable interface 6 in the device 8, and converted into appropriate device control signals. The device 8 draws current from a power supply, indicated in the diagram by the mains socket 7. When in standby mode, the device 8 is not completely disconnected from the mains power, since the interface 6 requires a small amount of power to be able to react to an activation signal 4 from the remote control unit 2. Furthermore, a small amount of current is continuously drawn by the typical ‘standby LED’ 5 which emits light as long as the device 8 is in standby mode. If the user wishes to completely disconnect the device 8 from the power supply when not in use, he must do this directly, for example by pressing an on/off button on the device 8 itself, or by unplugging the device 8 at the mains socket 7.

Figure 2:
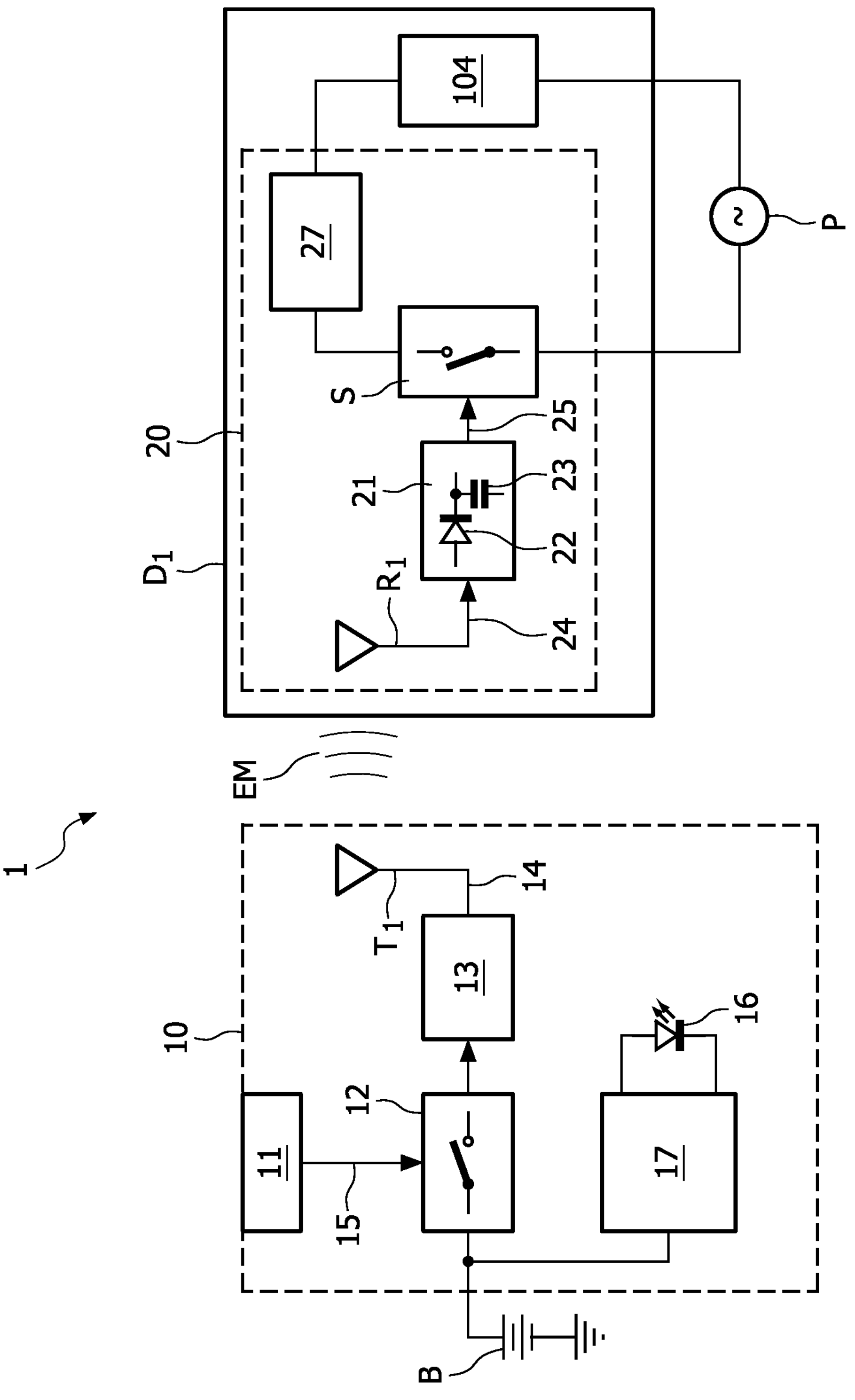
FIG. 2 shows a first embodiment of a system according to the invention.

One embodiment of a system 1 according to the invention in shown in FIG. 2, with a remote control unit 10 and remote control interface module 20 for connecting or disconnecting a device $D_1$ to or from a power supply P. The device $D_1$ might be a television or other such device, with an effective load 104, representing the electrical components of the device $D_1$ required to carry out the functions of the device $D_1$. It will be clear that the remote control unit 10 shown here could be incorporated in the usual type of hand-held remote control device known from state of the art solutions, and the remote control interface module 20 could be incorporated into the device $D_1$ in the usual manner. For the sake of clarity, the components of the remote control unit 10 and remote control interface module 20 are emphasised relative to the other units so that their functionality can better be explained.

To activate or deactivate the device $D_1$, a user (not shown in the diagram) inputs a control signal 15 from a suitable button or interface 11 of the remote control unit 10. This might be the usual 'ON/OFF' button to be found on practically any remote control unit. In the embodiment shown, the control signal causes a switch 12 to be closed when the device $D_1$ is to be activated, i.e. reconnected to the power supply P. The closed switch 12 connects a battery B to a signal generator 13 which generates a first electrical signal 14. A transmitting antenna $T_1$ of the remote control unit 10 is caused to resonate accordingly, so that electromagnetic radiation EM is transmitted by the transmitting antenna $T_1$. As explained above, the signal generator 13 can generate the first electrical signal 14 continuously as long as the user depresses the button 11, or as a pulsed signal (to increase the signal energy) or as a carrier signal modulated to carry device identification information. The skilled person will know how an appropriate signal generator 13 can be realised in order to carry out such functions, so that these need not be further elaborated here.

At the receiver side, a detecting antenna $R_1$ of the remote control interface module 20 is caused to resonate by the electromagnetic radiation EM originating from the transmitting antenna $T_1$ of the remote control unit 10, and a second electrical signal 24 is induced accordingly. Evidently, this signal 24 is an AC signal, and therefore rectified in a passive rectifier circuit 21 to convert it into a DC signal. The components of the passive rectifier circuit 21 in this example are a diode 22 and a smoothing capacitor 23. These components 22, 23 do not require any external power supply, so that the resulting switch actuating signal 25 is generated entirely in a passive manner. The switch actuating signal 25 then actuates a toggle switch S, which, when closed, connects the device $D_1$ to an external power supply P, or, when opened, disconnects the device $D_1$ from the external power supply P.

When the user has pressed the 'ON/OFF' button 11 to reactivate the device $D_1$ and the switch S is closed, a device control interface 27, indicated schematically as being included in the device $D_1$, is also connected to the power supply. When the user presses the 'ON/OFF' button 11 to deactivate the device $D_1$ and the switch S is opened accordingly, the device $D_1$ and the interface unit 27 are disconnected from the power supply, and no current is drawn until the device 10 is activated once again.

In this embodiment, the device control interface 27 is the usual type of interface for receiving device function commands. Such commands, for example to change channels or adjust some setting of the device $D_1$, can then be issued by the user in the usual manner. Here, the remote control unit 10 also comprises a usual infrared remote control module 17 and an infrared diode 16, indicated in a simplified manner in the diagram. A beam of infrared light is detected by the corresponding device control interface 27 so that the user can control the device $D_1$ in the usual manner The remote control unit 10 shown here with its components such as the signal generator 13 and transmitting antenna $T_1$ could easily be incorporated into the usual type of hand-held remote control device familiar to most users.

Figure 3A:
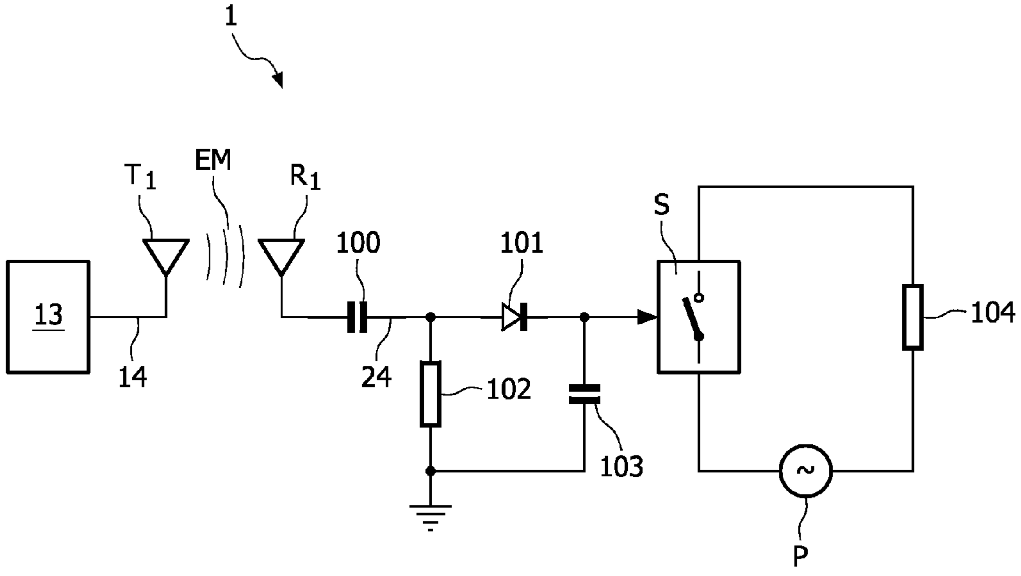
FIG. 3*a* shows a first circuit realisation of a conversion circuit according to the invention.
Figure 4A:
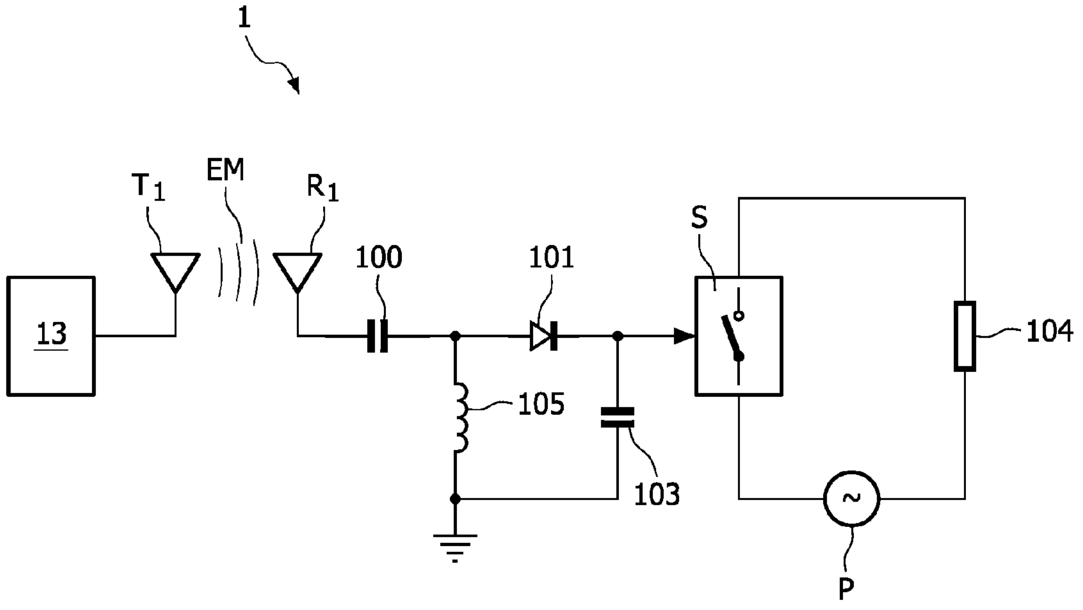
FIG. 4*a* shows a second circuit realisation of a conversion circuit according to the invention.

In the following, alternative realisations of the conversion unit 21 are presented with the aid of FIGS. 3*a*, 4*a* and 5*a*. In each case, only the signal generator 13 and transmitting antenna $T_1$ of a remote control unit are indicated on the transmit side. On the receive side, only the relevant components of the conversion unit in each case are shown. The transmitting antenna $T_1$ and detecting antenna $R_1$ are assumed to be separated by a distance of a few metres, e.g. up to 10 meters, which distance is accounted for in the mutual coupling of the antennae $T_1$, $R_1$ by using the free space function, as will be known to a person skilled in the art. In each of the three embodiments shown, the transmitting antenna $T_1$ is assumed to be an ideal dipole. As will be known to a person skilled in the art, however, the range of the transmitting antenna $T_1$ could be improved by using a directional antenna, so that the energy of the transmitted signal is concentrated into essentially one direction instead of radiating outwards in all directions. The signal generator 13 comprises a frequency generator for generating a signal at 868 MHz. The device to be controlled is represented by a resistive load 104. In FIGS. 3*a* and 4*a*, the actuating switch S is a simple toggle switch. Other units not pertinent to the explanation have been omitted from the diagrams for the sake of clarity.

FIG. 3*a* shows a first realisation of the passive conversion unit 10. Here, the electromagnetic radiation EM is detected by the detecting antenna $R_1$, which resonates to give an induced AC signal at the receive side, and is then decoupled by the decoupling capacitor 100 (with a value of 1.5 pF) to give a second electrical AC signal 24. This is rectified by a rectifier diode 101, for example an Agilent Technologies HSMS285x series Schottky diode. Thereafter, a smoothing capacitor 103 with a value of 47 pF smoothes the rectified output to give the switch actuating signal 25. A small resistance 102 with a value of 1 kΩ allows a minimal current to flow in the passive conversion unit. The device is represented by a resistive load 104 of 22 kΩ.

Figure 3B:
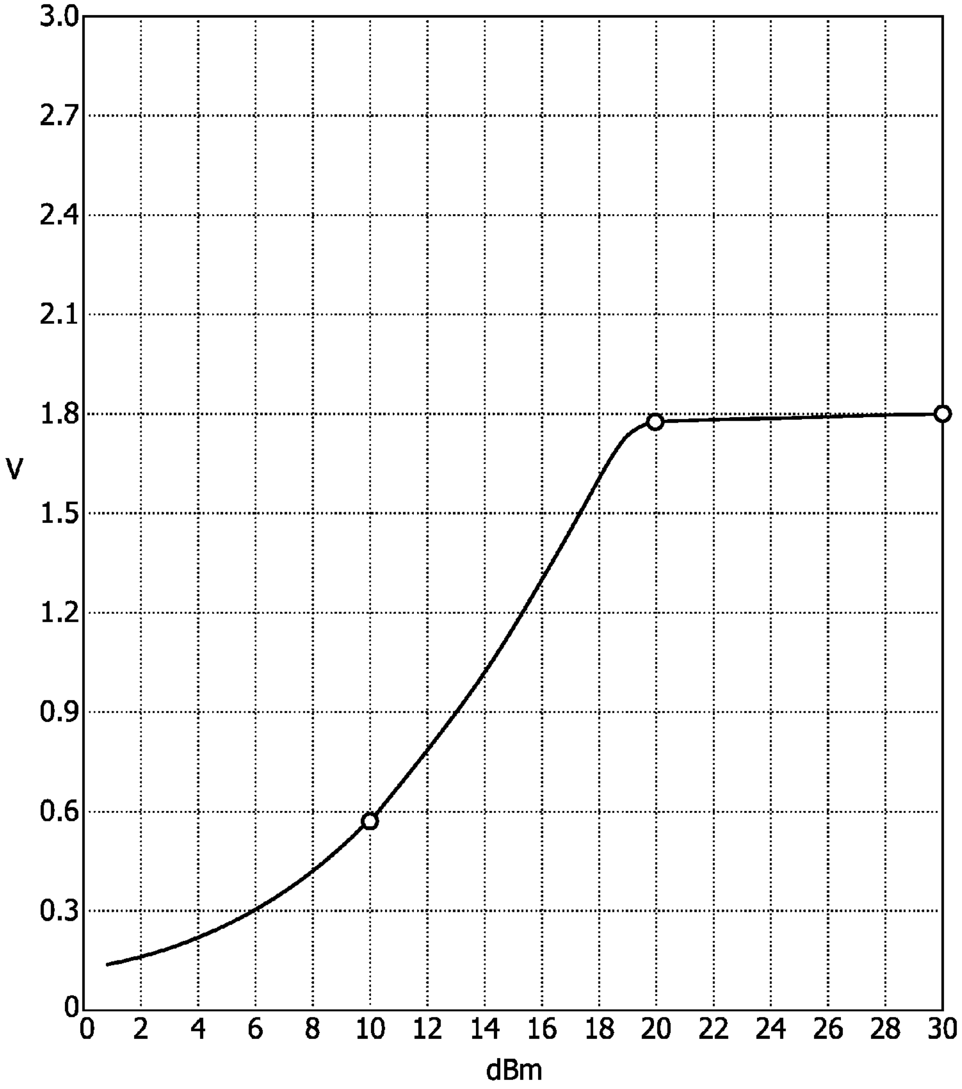
FIG. 3*b* shows a graph of voltage against power ratio for the circuit of FIG. 3*a*.

FIG. 3*b* shows a graph of voltage, measured across the smoothing capacitor 103, against the power ratio in dBm of the electromagnetic radiation EM transmitted by the transmitting antenna $T_1$. As can be seen from the graph, a voltage of about 1.77V can be obtained across the smoothing capacitor 103 when the power rating of the signal generator 13 provides electromagnetic radiation EM at 20 dBm. This voltage is sufficient to actuate a MEMS switch S. When this switch S is closed, the load 104 is connected to the power supply P, and when the switch S is opened, the load 104 is disconnected from the power supply P.

A rectified signal 25 of higher voltage can be obtained using an alternative passive conversion circuit, as shown in FIG. 4*a*. Here, a resonant circuit is given by an inductor 105 with a value of 22 nH in conjunction with the decoupling capacitor 100 (1.5 pF). These values are chosen such that the frequency of the signal induced at the receiver side is essentially the same as that on the transmit side, using the well-known function for a resonator circuit:

$$fc = \frac{1}{2\pi \overline{LC}}$$

where L is the value of an inductor, and C is the value of a capacitor of the resonator circuit. The values of the components 105, 100 are chosen so that the frequency $f_c$ of the induced signal is essentially the same as the frequency of the signal generated by the signal generator 13, in this case 876 MHz. The resonant circuit is followed by the same rectifier circuit components, namely a rectifier diode 101 and smoothing capacitor 103 as shown in FIG. 3*a* above.

Figure 4B:
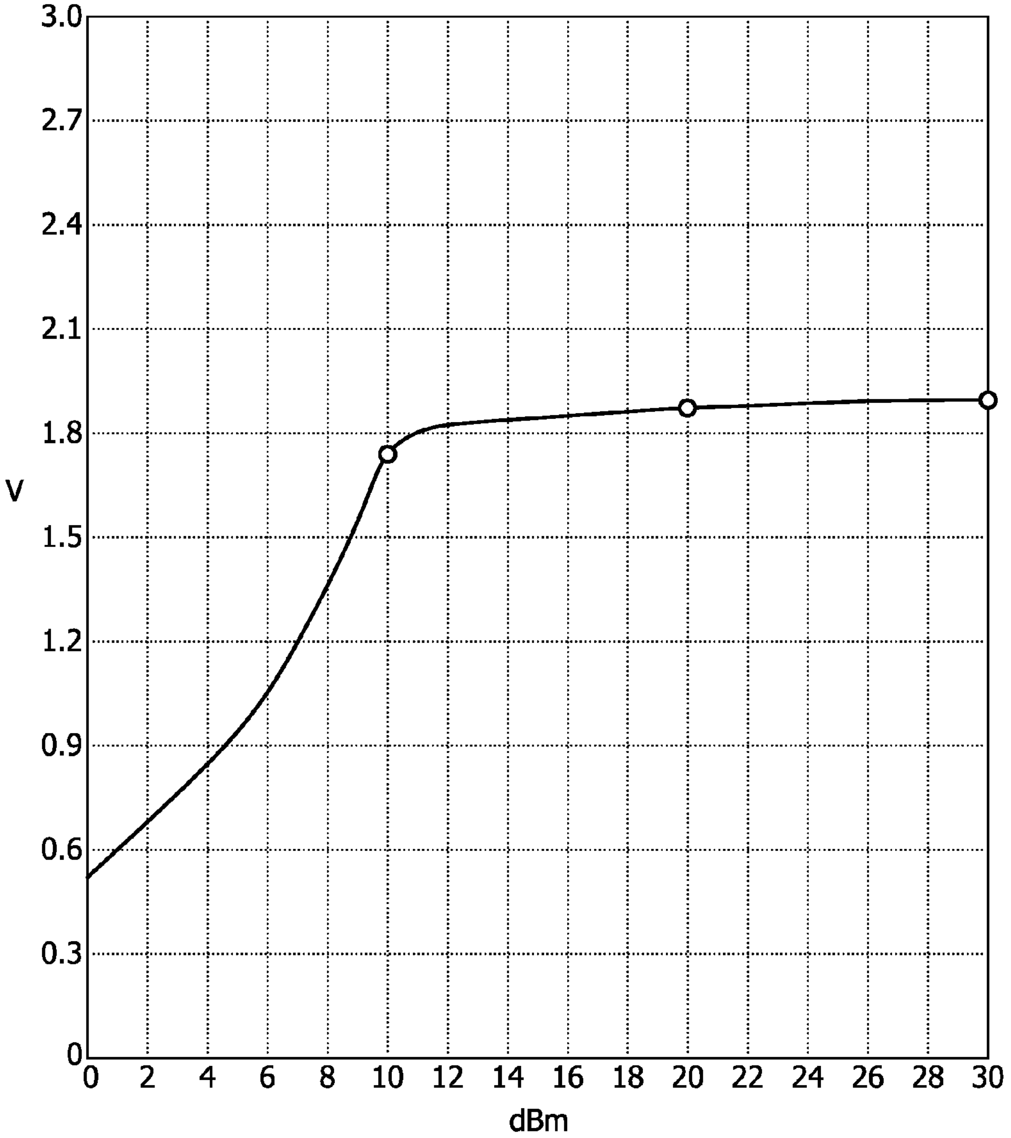
FIG. 4*b* shows a graph of voltage against power ratio for the circuit of FIG. 4*a*.

This circuit results in a higher voltage across the smoothing capacitor 103 while requiring lower signal energy levels at the transmit side. In this example also, a MEMS (micro-electro-mechanical system) could be used for the switch S. As can be seen from the graph in FIG. 4*b*, a voltage of about 1.76V is achieved at a signal power of only 10 dBm. This compares favourably with the values obtained using the circuit in FIG. 3*a*. This means that the switch can be reliably and accurately switched even with a signal of relatively low power at the transmit side.

Figure 5A:
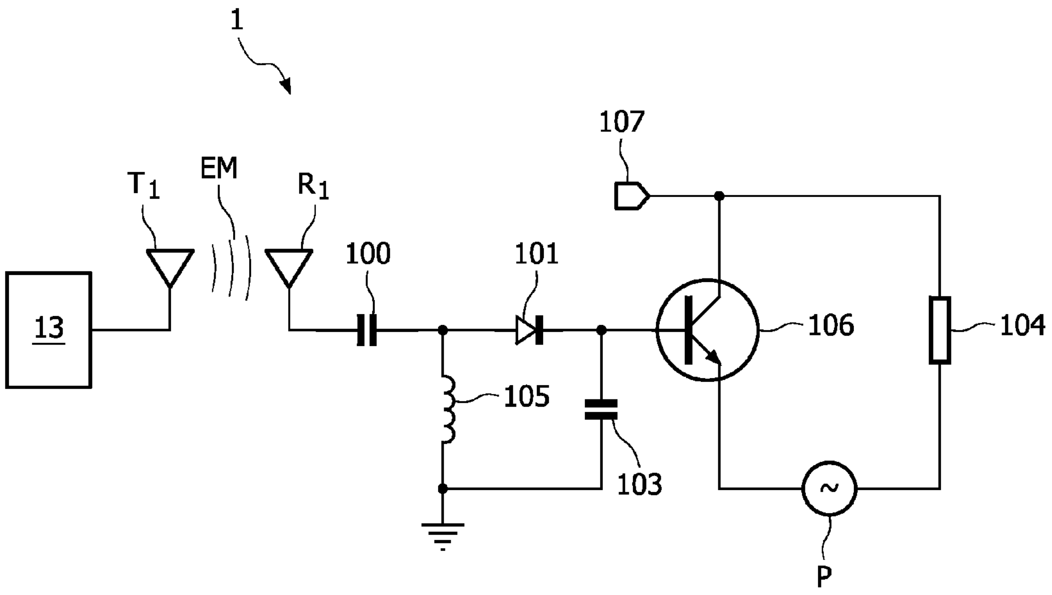
FIG. 5*a* shows a third circuit realisation of a conversion circuit according to the invention.
Figure 5B:
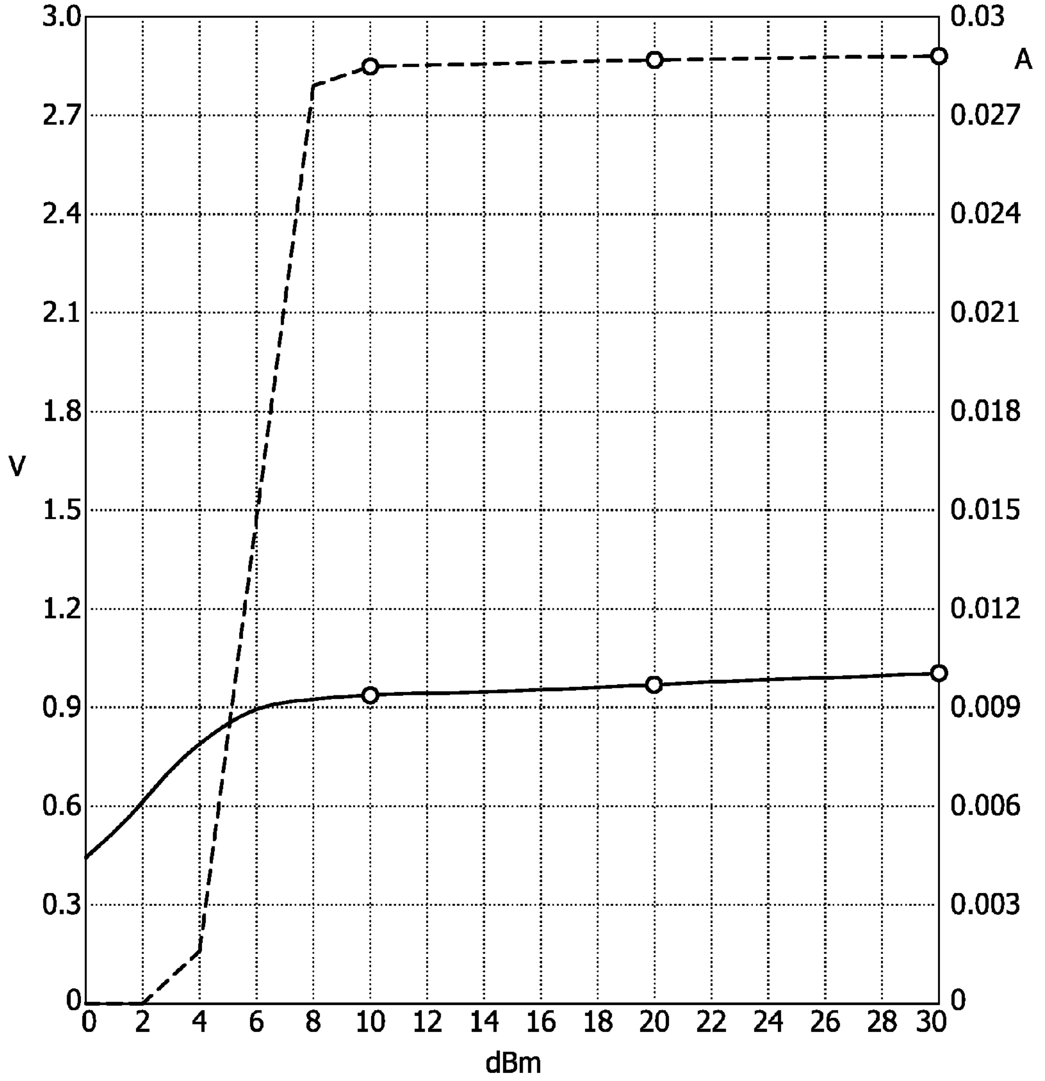
FIG. 5*b* shows a graph of voltage and current against power ratio for the circuit of FIG. 5*a*.

If it is necessary to switch higher voltages than those which can be tolerated by a MEMS switch, the circuit of FIG. 4*a* can be modified to include a semiconductor switch and a supplementary voltage source, as shown in FIG. 5*a*. In this example, the semiconductor switch comprises a transistor switch 106 such as Agilent Technologies HBFP0450. The supplementary voltage source can be a lithium battery 107, which provides a constant voltage for a relatively long time span. It is also conceivable that a solar cell could be used as a supplementary voltage source 107, or that the supplementary voltage source 107 could be recharged from the mains supply when the device is in operation. Alternatively, the supplementary voltage source 107 could be recharged without the need for mains power, for example using solar energy or thermal energy. The transistor switch 106 is capable of switching a heavier load, i.e. a stronger current, which may be necessary, depending on the type of device 104 to be connected to a mains power supply P. It will be emphasised at this point that the circuitry in this example is only very simply outlined, and that other components and circuitry will be required to disconnect the device from the power supply when the device is turned off by the user, or to interface the low-voltage semiconductor circuitry with the device-side high-voltage circuitry. This will be known to a person skilled in the art, and need not be given in detail here, FIG. 5*b* shows the corresponding graphs of voltage (solid line) and load current (dashed line) against power ratio in dBm. As can be seen clearly from the graph, even a signal power of only 10 dBm is sufficient to obtain a voltage of 0.915V across the smoothing capacitor 103 and to allow a current of 28 mA to flow through the load 104. The obtained values for voltage and current are only marginally less that the values obtained for signal power ratios of 20 dBm (0.937V, 29 mA) and 30 dBm (0.962V, 29 mA) respectively.

This circuit solution also disconnects the device 104 from the mains power supply P when the device is turned off. When the device is turned off, this circuit does not draw any current. Only when the device is turned on will a small amount of power be consumed by the semiconductor circuit, negligible compared with the standby power dissipated by a comparable device in standby mode according to state of the art solutions.

Figure 6:
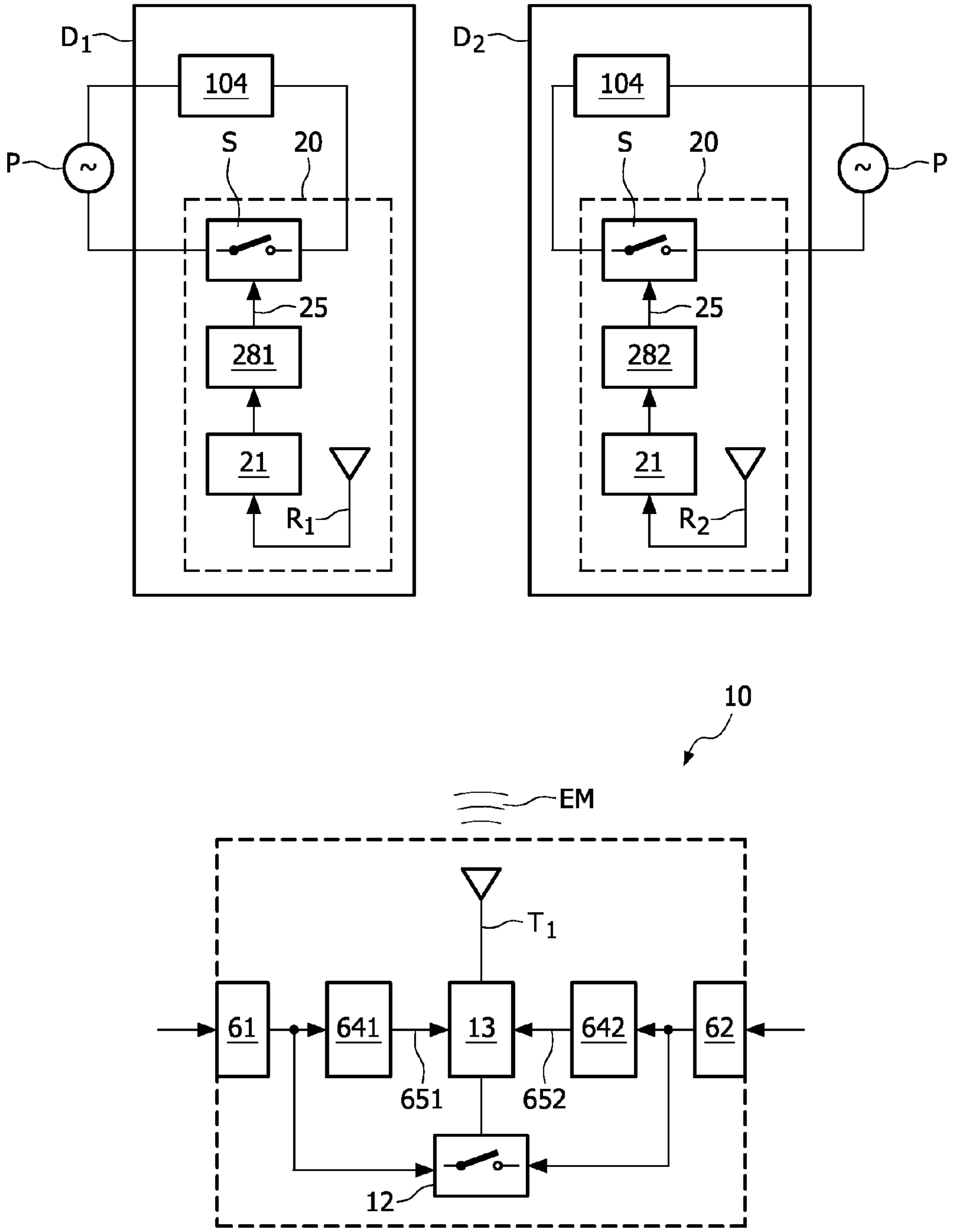
FIG. 6 shows a system according to a second embodiment of the invention.

A single remote control unit according to the invention can be used to control more than one device, as is often the case for home entertainment devices such as television, tuner, satellite receiver etc. Such a scenario, with two distinct devices $D_1$, $D_2$, is shown schematically in FIG. 6. For the sake of simplicity, each device $D_1$, $D_2$ is shown in a separate circuit with power supply P and corresponding switch S. Evidently, the power supply P can simply be the mains power supply for both devices $D_1$, $D_2$.

A remote control unit 10 for activating and deactivating both devices $D_1$, $D_2$ comprises a signal generator 13 and a transmitting antenna $T_1$. The user (not shown) can select a device for turning on or off by pressing the appropriate button, in this case button 61 to control device $D_1$, or button 62 to control device $D_2$. The control of device $D_1$ will now be explained. When the user presses button 61, a switch 12 is closed so that the signal generator 13 is connected to a battery (not shown) of the remote control unit 10. At the same time, a device identification unit 641 provides the signal generator with an appropriate device identification code 651 so that the signal generator 13 generates a series of pulses in an ISM band, modulated using the device identification code 651. For device $D_1$, the device identification code 651 results in a series of long pulses. The electrical signal 14 generated in this way is transmitted by the transmitting antenna $T_1$ as electromagnetic radiation EM.

Receiving antennae $R_1$, $R_2$ of the devices $D_1$, $D_2$ detect the electromagnetic radiation EM and perform passive rectification with a circuit 21 in the manner already described above. Each remote control interface 20 is also equipped with a unit for performing device identification. Continuing with the above example, the remote control interface 20 for device $D_1$ comprises a device identification unit 281 which passes a switch actuating signal 25 when the signal received by the receiving antenna $R_1$ can be decoded to give the device identification code 651 for device $D_1$. Therefore, since the user has selected device $D_1$ for activation or deactivation, only the device identifier unit 281 in the remote control interface 20 of the device $D_1$ will allow the switch S to be actuated. The device identifier unit 282 in the remote control interface 20 of the device $D_2$ will not register a match, and will therefore not pass a switch actuating signal 25 to its switch S, leaving device $D_2$ unaffected.

The device $D_2$ can be controlled in the same way. Here, the user presses an appropriate button 62, causing a device identification unit 642 to provide the signal generator with an appropriate device identification code 652 so that the signal generator 13 generates a series of short pulses, in contrast to the pulses associated with $D_1$, in an ISM band, corresponding to the device identification code 652. In the remote control interface module 20 associated with device $D_2$, the device identification unit 282 passes the switch actuating signal 25 since the signal received by the receiving antenna $R_1$ decodes to give the device identification code 652 for device $D_2$, while the device identifier unit 281 in the remote control interface 20 of the device $D_1$ will not register a match, and will therefore not pass a switch actuating signal 25 to its switch S, leaving device $D_1$ unaffected.

Obviously, more than two devices can be controlled in this manner, but only two have been shown here for the sake of simplicity. A state of the art remote control unit capable of being used to control a plurality of devices usually already has one or more dedicated buttons for selecting the desired device. The design and manufacture of such a remote control unit could easily be adapted for use in such a system by including a signal generator and transmitting antenna as described above.

Figure 7:
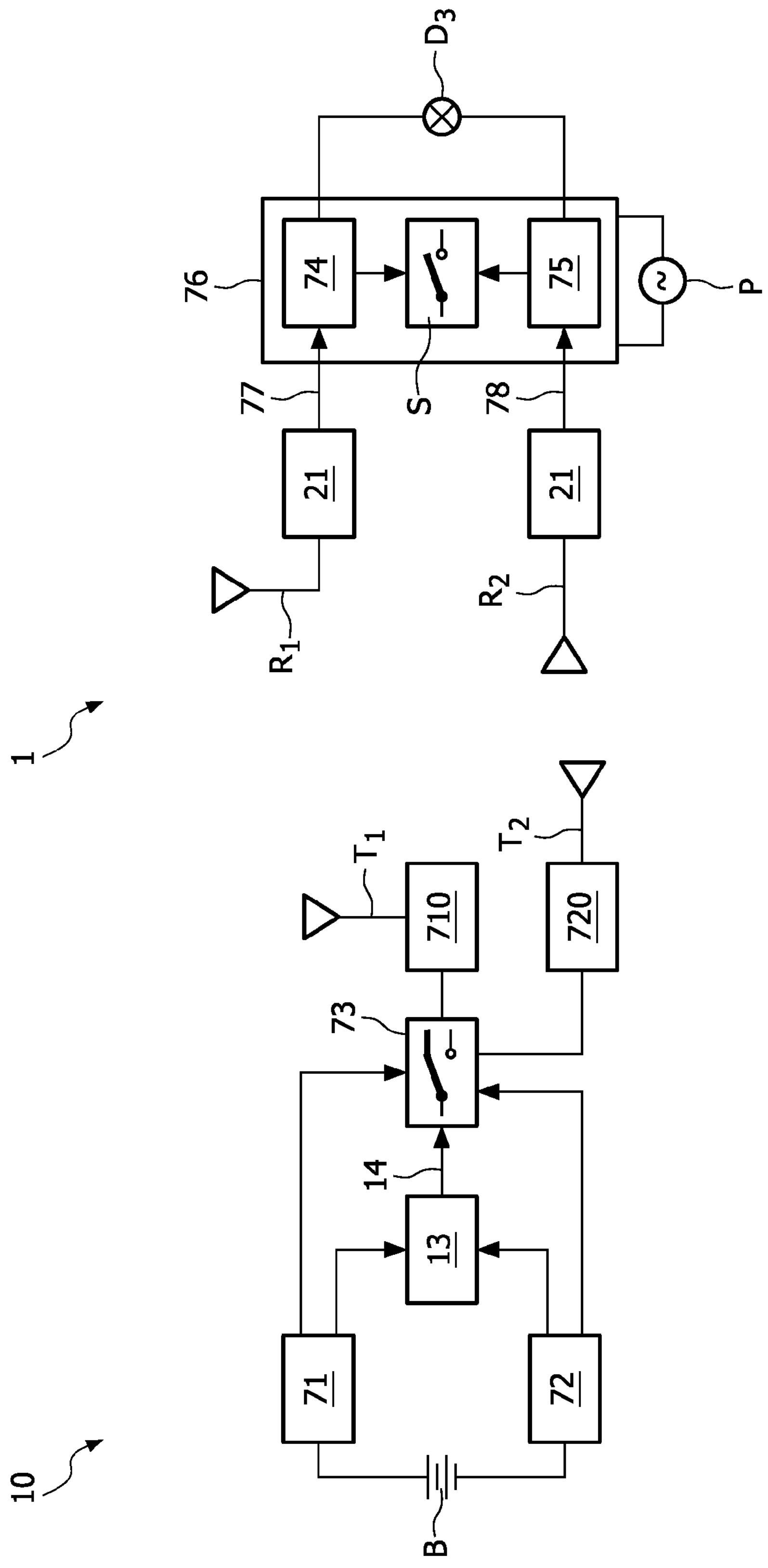
FIG. 7 shows a system according to a third embodiment of the invention.

The method according to the invention can also be applied to control devices that feature relatively simple functions for example to increase or decrease a setting such as volume, brightness, etc. Using the example of a light source $D_3$, FIG. 7 shows another, third, embodiment of the system according to the invention. The light source $D_3$, can be remotely controlled to turn it on or off, and to increase or decrease the brightness. The system comprises an actuating switch S as described above to disconnect the light source $D_3$ from a power supply P, or to reconnect the light source $D_3$ and power supply P. For the sake of simplicity, the switch S is shown in a light source control unit 77, which can be incorporated, for example, in a pedestal or ceiling fixture of the light source $D_3$.

A remote control unit is equipped with a pair of transmitting antennae $T_1$, $T_2$, and a corresponding remote control interface module is equipped accordingly with a pair of receiving antennae $R_1$, $R_2$. Radiation characteristics of the transmitting antennae $T_1$, $T_2$ are matched to radiation characteristics of the receiving antennae $R_1$, $R_2$, so that electromagnetic waves radiated by the first transmitting antenna $T_1$ will primarily be detected by the first receiving antenna $R_1$, while electromagnetic waves radiated by the second transmitting antenna $T_2$ will primarily be detected by the second receiving antenna $R_2$. In this embodiment, the radiation characteristics are polarisation characteristics, and the generated electrical signal is polarised as will be explained in detail below.

A remote control unit 10 is shown with two different user input buttons 71, 72. When the user presses either of the buttons, a battery B is connected to a signal generator 13 so that a first electrical signal 14 is generated. Depending on which button 71, 72 was pressed, a switch 73 is thrown to connect the electrical signal 14 to either one of the transmitting antennae $T_1$, $T_2$. In the example shown, pressing button 71 causes the switch to direct the electrical signal 14 to a first polarisation unit 710, where the electrical signal is subject to left-hand circular polarisation before being applied to the first transmitting antenna $T_1$. Pressing button 72 causes the switch to direct the electrical signal 14 to a second polarisation unit 720, so that the electrical signal is subject to right-hand circular polarisation before being applied to the second transmitting antenna $T_2$. The types of polarisation mentioned here are only exemplary, and it will obvious to a person skilled in the art that any other suitable types of polarisation could be applied, for instance left- or right-hand elliptical polarisation.

At the receiver side, the receiving antennae $R_1$, $R_2$ detect electromagnetic radiation, while each of these antenna responds particularly to the polarisation of the corresponding transmit antenna $T_1$, $T_2$. An induced signal is passively converted in a conversion unit 21 using any one of the techniques described above, and a corresponding control signals 77, 78 is forwarded to a control unit 76 for the light source $D_3$. The control signal 77 from the first receiving antenna $R_1$ is input to an up control unit 74, which can close the switch S and increase the brightness of the lamp $D_3$. The control signal 78 from the second receiving antenna $R_2$ is input to a down control unit 75, which can decrease the brightness of the lamp $D_3$ and open the switch S.

In this example, the functions ‘turn on’ and ‘increase brightness’ are advantageously controlled by a single button 71. When the light source is off, i.e. disconnected from the power supply, the user can press button 71 to turn on the light source $D_3$. Directly after turning on, the brightness of the light source may be at its lowest level. The user can keep the button pressed, or press the button repeatedly, to increase the brightness of the light source $D_3$. Similarly, the functions ‘decrease brightness’ and ‘turn off’ are advantageously controlled by the single button 72, so that, when the light source L is already on and the user presses this button 72, the brightness of the lamp $D_3$ is decreased steadily until the user releases the button 72. If the user keeps the button 72 pressed and the light source $D_3$ has reached its lowest brightness level, the lamp is disconnected from the power supply P, so that no more current is drawn by the lamp $D_3$.

The light source $D_3$ could comprise several different coloured LED light sources, e.g. red, green and blue, allowing any colour light to be generated by appropriately controlling the brightness of the individual LEDs. For such a light source $D_3$, the up control unit 74 and down control unit 75 could also be realised or to alter the colour temperature of the light.

Since a signal transmitted by a transmitting antennae $T_1$, $T_2$ will primarily be detected by its counterpart receiving antenna $R_1$, $R_2$, this embodiment could be augmented by a simple comparator to determine which is the strongest received signal, and therefore which function (‘up’ or ‘down’) is being selected by the user.

For the sake of clarity, it is to be understood that the use of “a” or “an” throughout this application does not exclude a plurality, and “comprising” does not exclude other steps or elements. A “unit” or “module” can comprise a number of units or modules, unless otherwise stated.

The invention claimed is:

1. A method of actuating a switch between a device to be controlled and a power supply, which method comprises the steps of receiving from a user interface a control input;

generating a first electrical signal in a remote control unit;

based on the control input, selecting one of the first and second transmitting antenna of the remote control unit to convert the first electrical signal into electromagnetic radiation;

detecting the electromagnetic radiation with a first or second detecting antenna of a remote control interface module of the device to be controlled to obtain a second electrical signal;

passively converting the second electrical signal into a switch actuating signal;

actuating the switch using the switch actuating signal to switch the device to be controlled between an operating mode in which current is drat from the power supply by the device during operation, and an inactive mode in which the device is completely disconnected from the power supply so that no current is drawn by the device.

2. The method according to claim 1, wherein the first electrical signal comprises a high-frequency signal whose frequency lies in an ISM frequency band.

3. The method according to claim 1, wherein the first electrical signal comprises a pulsed high-frequency signal.

4. The method according to claim 1, wherein the first electrical signal comprises a carrier signal modulated to carry device identification information for one of a plurality of devices to be controlled.

5. The method according to claim 4, wherein a switch is actuated on the basis of the device identification information.

6. A remote control interface module comprising a first and second detecting antenna for detecting electromagnetic radiation transmitted by a first and second transmitting antenna of a remote control unit, respectively, to obtain a second electrical signal;

a passive conversion unit for passively converting the second electrical signal into a switch actuating signal;

and a switch for actuating by the actuating signal to switch a device to be controlled between an operating mode in which current is drawn by the device during operation and an inactive mode in which the device to be controlled is completely disconnected from the power supply so that no current is drawn by that device.

7. The remote control interface module according to claim 6, wherein the passive conversion unit comprises a passive rectifier circuit.

8. The device comprising a remote control interface module according to claim 6.

9. A system for actuating a switch between a device to be controlled and a power supply, which system comprises a signal generator for generating a first electrical signal in a remote control unit;

a first and second transmitting antenna of the remote control unit for converting the first electrical signal into electromagnetic radiation;

a user interface for inputting a control input to select one of the first and second transmitting antenna to perform the conversion;

a first and second detecting antenna for detecting electromagnetic radiation to obtain a second electrical signal;

a passive conversion unit for passively converting the second electrical signal into a switch actuating signal;

and a switch for actuating by the actuating signal to switch a device to be controlled between an operating mode in which current is drawn by the device during operation and an inactive mode in which the device to be controlled is completely disconnected from the power supply so that no current is drawn by that device.

10. The system according to claim 9, wherein the first transmitting antenna and/or the second transmitting antenna comprise directional antennae.

11. The system according to claim 9, wherein radiation characteristics of the first transmitting antenna are matched to radiation characteristics of the first receiving antenna, and/or radiation characteristics of the second transmitting antenna are matched to radiation characteristics of the second receiving antenna, such that electromagnetic radiation originating from the first transmitting antenna is detected by the first receiving antenna, and/or electromagnetic radiation originating from the second transmitting antenna is detected by the second receiving antenna.

12. The system according to claim 11, wherein the radiation characteristics of the transmitting antennae comprise polarisation characteristics.

13. A remote control unit for use in the system according to claim 9 comprising a user interface for inputting a control input, a signal generator for generating a first electrical signal according to the control input, and at least two transmitting antenna for converting the first electrical signal into electromagnetic radiation for detection by a remote control interface module comprising a first detecting antenna for detecting electromagnetic radiation to obtain a second electrical signal;

a passive conversion unit for passively converting the second electrical signal into a switch actuating signal;

and a switch for actuating by the actuating signal to switch a device to be controlled between an operating mode in which current is drawn by the device during operation and an inactive mode in which the device to be controlled is completely disconnected from the power supply so that no current is drawn by that device.

14. The remote control unit according to claim 13, comprising an additional control interface arrangement for transmitting control signals to a device control interface of a remote control interface module of the device to be controlled.

* * * * *